(12) United States Patent
Karakashian et al.

(10) Patent No.: US 7,769,825 B2
(45) Date of Patent: *Aug. 3, 2010

(54) SYSTEM AND METHOD FOR WEB SERVICES JAVA API-BASED INVOCATION (75) Inventors: Todd Karakashian, San Francisco, CA (US); Manoj Cheenath, Alameda, CA (US); Don Ferguson, San Jose, CA (US)

(73) Assignee: BEA Systems, Inc., Redwood Shores, CA (US)

( * ) Notice: Subject to any disclaimer, the term of this patent is extended or adjusted under 35 U.S.C. 154(b) by 1140 days.

This patent is subject to a terminal disclaimer.

(21) Appl. No.: 10/606,573

(22) Filed: Jun. 26, 2003

(65) Prior Publication Data

US 2004/0064503 A1    Apr. 1, 2004

Related U.S. Application Data (63) Continuation-in-part of application No. 10/366,236, filed on Feb. 13, 2003.

(60) Provisional application No. 60/359,098, filed on Feb. 22, 2002, provisional application No. 60/392,217, filed on Jun. 27, 2002.

(51) Int. Cl.
G06F 15/16 (2006.01)
G06F 3/00 (2006.01)

(52) U.S. Cl. .................. 709/219; 709/230; 719/330

(58) Field of Classification Search ......... 709/202–203, 709/217, 219, 227, 230; 379/201.03; 707/103, 707/3, 10; 719/315, 330–332; 717/149
See application file for complete search history.

(56) References Cited

U.S. PATENT DOCUMENTS

| 6,104,868 | A | 8/2000 | Peters et al. ........... 395/200.32 |
| 6,457,066 | B1 | 9/2002 | Mein et al. |
| 6,792,605 | B1 | 9/2004 | Roberts et al. |
| 6,970,869 | B1 | 11/2005 | Slaughter et al. |
| 6,985,939 | B2 | 1/2006 | Fletcher et al. |
| 6,990,532 | B2 | 1/2006 | Day et al. |
| 7,000,238 | B2 | 2/2006 | Nadler et al. |
| 7,013,340 | B1 | 3/2006 | Burd et al. |
| 7,055,143 | B2 | 5/2006 | Ringseth et al. |
| 7,127,713 | B2 | 10/2006 | Davis et al. |
| 7,152,090 | B2 * | 12/2006 | Amirisetty et al. .......... 709/200 |
| 7,240,125 | B2 | 7/2007 | Fleming |
| 7,251,674 | B2 | 7/2007 | Banerjee et al. |
| 7,254,601 | B2 | 8/2007 | Baller et al. |
| 7,325,047 | B2 | 1/2008 | Brittenham et al. |

(Continued)

Primary Examiner—Peling A Shaw
(74) Attorney, Agent, or Firm—Fliesler Meyer LLP (57) ABSTRACT A runtime architecture for web services utilizes a container driver to accept an invoke request for web services, such as from a protocol adapter. The container driver performs any necessary data binding and unbinding required to process the invoke request and associated message context, utilizing an appropriate plugin component. An interceptor receives the context information from the container driver and modifies the message context for web service compatibility. An invocation handler receives the formatted context information from the container driver and passes parameters from the message context to the target of the request. The invocation handler processes values returned from the target and passes these values to the container driver. The container driver can then formulate a response to the invoke request, and return the response and message context to the client or protocol adapter.

23 Claims, 3 Drawing Sheets

U.S. PATENT DOCUMENTS

| | | |
|---|---|---|
| 2002/0046294 A1 | 4/2002 | Brodsky et al. |
| 2002/0071423 A1 | 6/2002 | Mirashrafi et al. |
| 2002/0099738 A1 | 7/2002 | Grant |
| 2002/0152210 A1 | 10/2002 | Johnson et al. |
| 2002/0178254 A1 | 11/2002 | Brittenham et al. |
| 2003/0004746 A1 | 1/2003 | Kheirolomoom et al. |
| 2003/0005181 A1 | 1/2003 | Bau, III et al. |
| 2003/0033369 A1 | 2/2003 | Bernhard |
| 2003/0105884 A1 | 6/2003 | Upton |
| 2003/0110242 A1 | 6/2003 | Brown et al. |
| 2003/0110270 A1 | 6/2003 | Copp |
| 2003/0110373 A1 | 6/2003 | Champion |
| 2004/0267933 A1 | 12/2004 | Przybylski et al. |
| 2006/0036448 A1 | 2/2006 | Haynie et al. |

\* cited by examiner

SYSTEM AND METHOD FOR WEB SERVICES JAVA API-BASED INVOCATION

CLAIM OF PRIORITY

This application is a continuation-in-part of U.S. Utility patent application Ser. No. 10/366,236, filed Feb. 13, 2003 entitled "WEB SERVICES RUNTIME ARCHITECTURE", which claims the benefit of U.S. Provisional Patent Application Ser. No. 60/359,098, filed Feb. 22, 2002 entitled "WEB SERVICES RUNTIME ARCHITECTURE", both of which are incorporated herein by reference. This application also claims the benefit of U.S. Provisional Application No. 60/392,217, filed Jun. 27, 2002, incorporated herein by reference.

CROSS-REFERENCES

This application is related to U.S. Utility patent application Ser. No. 10/366,246, filed Feb. 13, 2003 entitled "WEB SERVICES PROGRAMMING AND DEPLOYMENT", and U.S. Provisional Patent Application Ser. No. 60/359,231, filed Feb. 22, 2002 entitled "WEB SERVICES PROGRAMMING AND DEPLOYMENT", which applications are also incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to implementing web services, and to a system for using an implementation such as JAX-RPC for invoking a web service from a Java client application.

BACKGROUND

Web services are becoming an integral part of many application servers, with an importance that can rival HTTP or RMI stacks. Java standards for web services are being developed through the Java Community Process. Businesses are building important applications on top of web services infrastructures, such as is available in WebLogic Server from BEA Systems of San Jose, Calif.

Web services are a type of service that can be shared by and used as components of distributed Web-based applications. They commonly interface with existing back-end applications, such as customer relationship management systems, order-processing systems, and so on.

Traditionally, software application architecture tended to fall into two categories: huge monolithic systems running on mainframes or client-server applications running on desktops. Although these architectures work well for the purpose the applications were built to address, they are closed and can not be easily accessed by the diverse users of the Web.

Thus the software industry is evolving toward loosely coupled service-oriented applications that dynamically interact over the Web. The applications break down the larger software system into smaller modular components, or shared services. These services can reside on different computers and can be implemented by vastly different technologies, but they are packaged and transported using standard Web protocols, such as XML and HTTP, thus making them easily accessible by any user on the Web.

Presently however, there is no complete implementation of Web services upon which to build.

SUMMARY

The present invention relates to implementing web services, and to a system for using an implementation such as JAX-RPC for invoking a web service from a Java client application.

The Java API for XML-based RPC (JAX-RPC) is a an increasingly common industry standard specification that defines a client API for invoking a web service and defines standards that allow software developers to create interoperable web services.

The following list briefly describes the core JAX-RPC interfaces and classes.

Service—Main client interface. Used for both static and dynamic invocations.

ServiceFactory—Factory class for creating Service instances.

Stub—Represents the client proxy for invoking the operations of a web service. Typically used for static invocation of a web service.

Call—Used to dynamically invoke a web service.

JAXRPCException—Exception thrown if an error occurs while invoking a web service.

Embodiments of the present invention provide an implementation of a system for providing web services, and that use JAX-RPC allow a client application to invoke the web service. Other features, aspects, and objects of the invention can be obtained from a review of the specification, the figures, and the claims.

DETAILED DESCRIPTION

A system and method in accordance with one embodiment of the present invention overcome deficiencies in existing web service implementations by providing a more stable, complete implementation that is suitable as an application integration platform.

A web services architecture can allow for communication over a number of transports/protocols. HTTP can continue to be a primary transport mechanism for existing applications, while transport mechanisms such as SMTP, FTP, JMS, and file system mailboxes can also be supported.

Message formats such as SOAP 1.1 and 1.2 with attachments can be used as primary message formats. It is also possible to accept web service requests that are XML-encoded and submitted via HTTP posts. A web services architecture can support plugging in other message formats and provide a mechanism for access to the raw message for user code.

A web services architecture can utilize a stack that supports a standards-based default binding of fundamental XML data types supported in various web service platforms. An API can be used to allow other binding mechanisms to be plugged in. The binding to be used can be specified on a per-operation basis.

Various security and messaging standards require a context or state to be associated with web service messages. A web services architecture can support the processing of multiple message contexts, such as those related to security or conversation ID, and can offer user code access to these contexts. Many of these contexts can be encoded into a SOAP header, although it is also possible to include the contexts in the underlying protocol layer (e.g., cookies in HTTP) or in the body of the message (e.g., digital signatures). A web services container can explicitly process contexts associated with planned security features for web services.

A web services stack can support a number of dispatch and synchrony models. Dispatch to both stateless and stateful components can be supported, using both RPC and messaging invocation semantics. Synchronous and asynchronous processing of requests can also be supported. In particular, it can be possible to enqueue an incoming message, to enqueue an outbound message, and to make asynchronous outbound calls. Enqueuing involves downloading files, one at a time, from a queue.

A component such as a session EJB can be used to implement application-hosted web services, such as for business logic. An API can be provided for sophisticated users to integrate other types of components, even custom components, into a web service mechanism. This may be used rarely, such as by developers who wish to build higher-level facilities and infrastructure on top of application-specific web services.

A web services architecture should not preclude the embedding of a web service container in a lightweight server running in a more restricted Java platform, such as J2ME/CDC. A very thin web service Java client, such as less than 100 k, can also be supported. Such an architecture allows support for a variety of web service standards, such as JAX-RPC. In addition, application-specific APIs can be defined for the implementation of web services.

A runtime web services architecture can support both synchronous and asynchronous ("one-way") RPC style web services, such as may be backended by an EJB. Message-style web services can also be supported, which allow content to be submitted to and received from a JMS destination. Endpoints can be supported in a transport-specific way. These endpoints can associate a transport-specific address with a web service. For instance, in HTTP a particular address can be associated with a web service to be invoked. For SMTP an email address can be associated with a web service.

Figure 1:
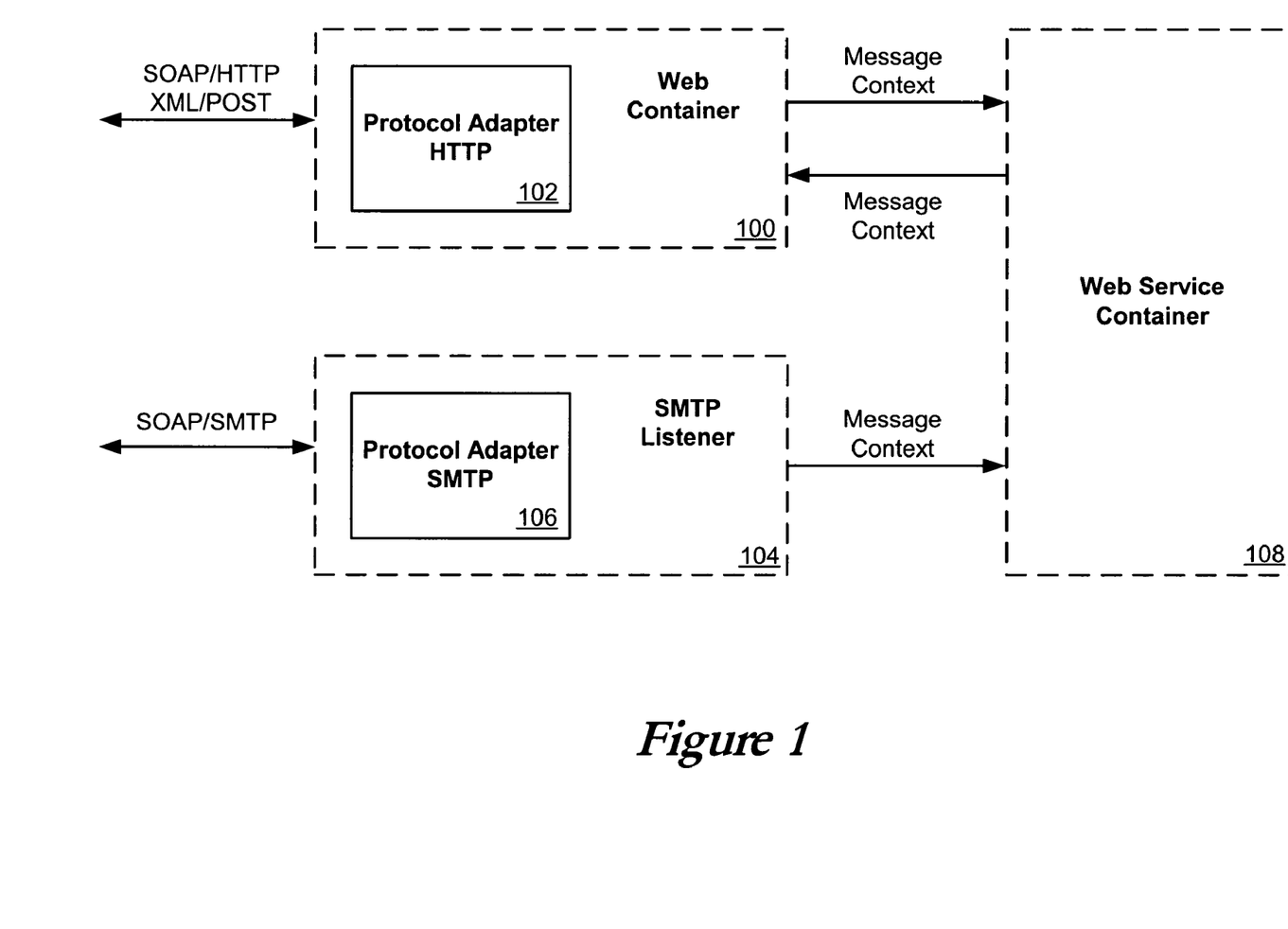
FIG. 1 is a diagram of a system in accordance with one embodiment of the present invention.

FIG. 1 shows the relationship of a web container 108 and SMTP listener 104 and a host server or web service container 108, utilizing an architecture in accordance with one embodiment of the present invention. A protocol adapter for HTTP 102 is shown in a web container 100, which can intercept a web service invoke via HTTP from a web services client. A protocol adapter for SMTP 106 is also shown in an SMTP listener 104, which can accept a web service invoke via SMTP. This architecture allows for pluggability in a number of places.

Figure 2:
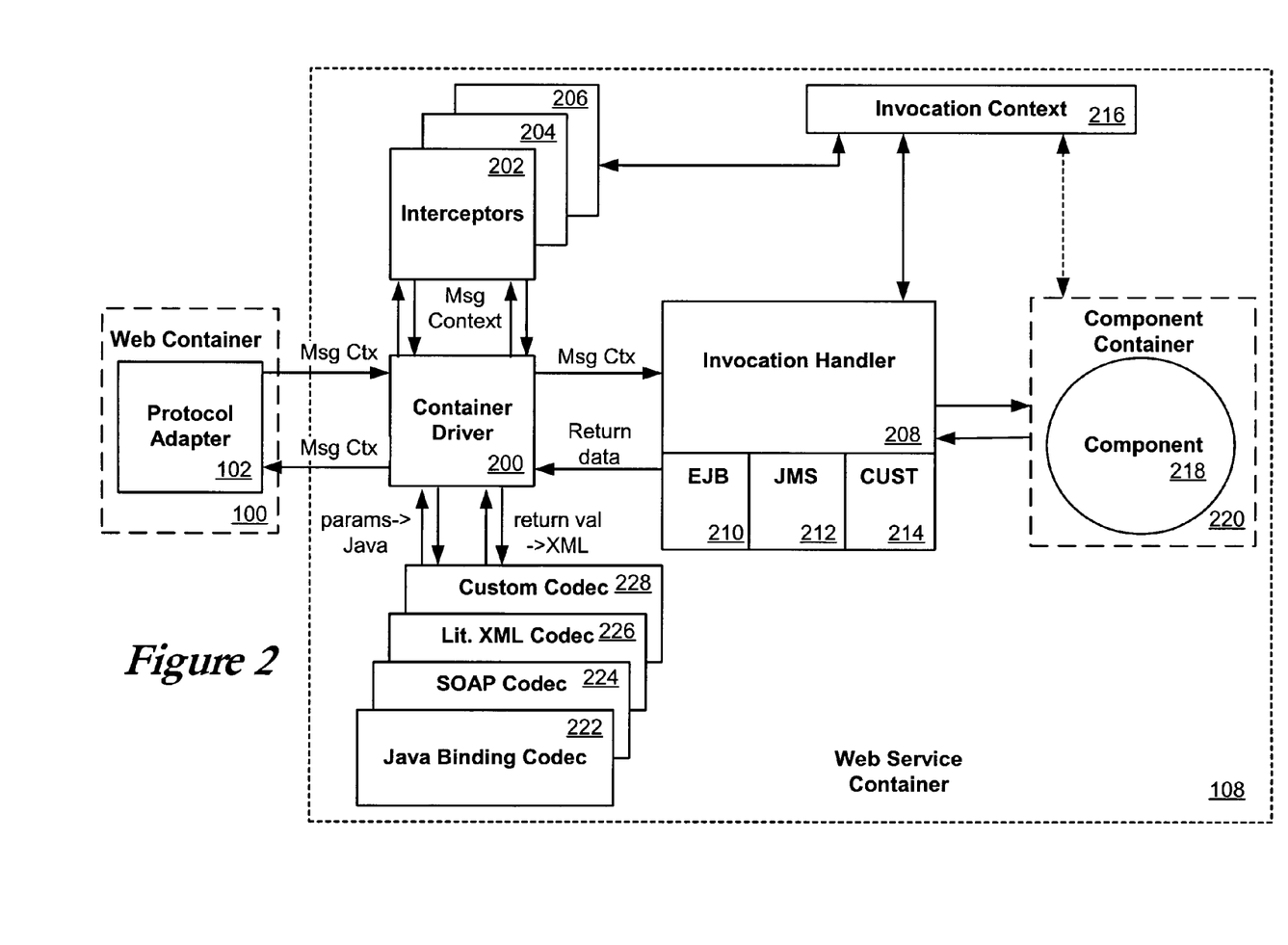
FIG. 2 is a diagram of a web service container that can be used with the system of FIG. 1.

FIG. 2 shows a diagram of the architecture of the web service container 108 of FIG. 1. The HTTP protocol adapter 102 of the web container 100 is shown passing message context to, and receiving message context from, a container driver 200. The container driver 200 receives the message context from the protocol adapter 102 and sends the message context to the registered inbound interceptors 202, 204, 206. After extracting the operation parameters and performing any necessary data binding, such as by using a Java Binding codec 222, a SOAP codec 224, an XML codec 226, or a custom codec 228, the container driver 200 submits the operation request to the appropriate invocation handler 208, such as for EJB 210 or JMS 212, or to a customized invocation handler 214. After receiving data back from the invocation handler 208, the container driver 200 can perform any data unbinding using the appropriate codecs 222, 224, 226, 228 and send the response to the outbound interceptors 202, 204, 206. The container driver 200 can then return the response to the protocol adapter 102. The protocol adapter, interceptors, and invocation handler can each have access to an invocation context object 216. The invocation handler 208 can also provide context access to the component 218 to which it delegates, which can be contained in a component container 220.

A message context is a representation of a web service invocation flowing through a container. A message context can contain a request message, which is the web service request. A message context can be rendered into the canonical form of SOAP plus attachments. A response message is the web services response, or at least a place holder for the response if the response has not been formulated yet. A response message can also be in the canonical form of SOAP plus attachments. Transport information can contain relevant information that is specific to the transport over which the request came, and over which the response must be sent. For example, the transport information can contain the HTTP request and response streams for HTTP transport. An invocation context can also be used, which is described below.

A protocol adapter can be inserted into the subsystem of a host server. A protocol adapter can be responsible for processing incoming requests for a particular transport/protocol, such as HTTP or SMTP. This allows the web service container to process web service messages in various formats that are sent over multiple protocols. It will also allow the web service container to reside in different kinds of servers. One condition for a protocol adapter is that the host server can support the protocol and that the message format can be converted into SOAP internally. There are no known important message formats that cannot be expressed via SOAP.

A protocol adapter can be responsible for identifying requests as web service messages, as well as routing the messages to a web services container. If the protocol being used supports synchronous responses, a protocol adapter can also receive the response data and return the data to the originator of the request. The protocol adapter can convert the message to the original message format if it is not SOAP plus attachments. A protocol adapter can deal with any message context that is required by the container, such as a conversation ID, and is transmitted at the protocol level, such as cookies in HTTP. The protocol adapter can propagate the message context to and from a web services container.

The actual implementation of protocol adapter functionality can depend on the architecture of the host server, as well as the way that the protocol is hosted in the server. For example, the functions of a protocol adapter can be implemented in part by the normal function of a web container for an HTTP protocol. Due to the dependency of protocol processing on server internals, there may not be many public protocol adapter APIs.

An invocation context can be used, which is an inheritable thread-local object that can store arbitrary context data used in processing a web service request. The context can be available from various components of the architecture involved in the processing of the request and response. Typical data that might be stored in such a context are a conversation ID, a message sequence number, and a security token. A particular invocation handler can choose to make the invocation context available to the target component. This can allow application code to read and write to the invocation context.

An architecture can utilize interceptors. Interceptors are plugins that can provide access to inbound and outbound web service messages. An interceptor API can be public, and an implementation of an interceptor API can be part of a web service application. An interceptor can modify SOAP messages as required. An interceptor can also read and write information on the invocation context. Interceptors can be associated with either operation, or with the namespace of the message body.

There are different types of interceptors. Header handlers can be used, for example, which operate only on message headers. Header handlers must declare which message headers they require so that the header information can be exposed, such as in WSDL generated for the web service. Flow handlers, on the other hand, can operate on full message content. Flow handlers do not require a declaration of which message parts are processed, and do not result in the existence of any additional information in the generated WSDL. Application developers may use header handlers primarily, while business units that are building infrastructure on top of an application server may choose to use flow handlers. Both APIs, however, can be public.

XML serialization and deserialization plugins can be supported, which can handle the conversion of method parameters from XML to Java objects and return values from Java to XML. Built-in mappings for the SOAP encoding data types can be included with an application server. The processing of literal XML data that is sent outside any encoding can also be supported, as well as Apache "Literal XML" encoding. Users can also implement their own custom data type mappings and plug those mappings in to handle custom data types.

A container driver can be used with a web services architecture in accordance with one embodiment of the present invention. A container driver can be thought of as the conceptual driver of a web service container. A container driver can implement the process flow involved in performing a web service request.

For RPC web services hosted on an application server, the default target of a web service invocation can be an EJB instance. For message-style web services, the default target can be a JMS destination. In certain cases, it may be desirable to allow other components or subsystems as targets. People can build middleware infrastructure on top of application servers to require this functionality. Therefore, an invocation handler API can be supported to allow the web service requests to be targeted at different components besides EJBs.

An invocation handler can insulate the web service container from details of the target object lifecycle, transaction management, and security policies. The implementer of an invocation handler can be responsible for a number of tasks. These tasks can include: identifying a target object, performing any security checks, performing the invocation, collecting the response, and returning the response to the container driver. The implementer can also be responsible for propagating any contextual state, such as a conversation ID or security role, as may be needed by a target component.

A protocol adapter can perform the following steps in one embodiment. The protocol adapter can identify the invocation handler of the target component deployment, such as a stateless EJB adapter. The protocol adapter can identify any additional configuration information needed by the invocation handler to resolve the service, such as the JNDI name of a deployed EJB home. This information can be in the deployment descriptor of the protocol adapter deployment, such as a service JNDI name, and/or the information could be in the headers or body of the request or in the protocol.

A protocol adapter can identify the style of a web service request, such as one-way RPC, synchronous RPC, or messaging. If necessary, a protocol adapter can convert an incoming request message into the SOAP with attachments canonical form. A protocol adapter can create a message context containing the request, a place holder for a response, information about the transport, and information about the target invocation handler. A protocol adapter can also dispatch message context configuration to the web service container.

A container driver can manage the flow of processing in the container. The container driver can receive the message context from the protocol adapter and, in one embodiment, sequentially performs the following steps. The container driver can dispatch to registered inbound interceptors, extract operation parameters, and perform data binding. The container driver can submit the operation request to the appropriate invocation handler, which can delegate the invoke to a target object. The container driver can receive a response from the invocation handler, possibly including a return value. If there is a return value, the container driver can perform data unbinding. If the synchrony model is request-response, the container driver can formulate a SOAP response. The response can be dispatched to registered outbound interceptors and returned to the protocol adapter for return to the caller.

The protocol adapter can return the SOAP response to the caller, converting the response back to the original message format if it was not SOAP. The protocol adapter, interceptors, and invocation handler can each have access to the invocation context object. Any necessary state needed during request processing can be propagated through this context. The invocation handler can also provide access to the context, such as to the component to which the invocation handler delegates.

An invocation handler that has been targeted to process an invoke can receive the following data from the container: the operation name, an array of Java Object parameters, any invocation handler configuration data, and the invocation context. The invocation handler can perform the invocation and return an array of Java Object return values.

An invocation handler can perform the following steps for one method in accordance with the present invention. A target object can be identified for the invocation. The invocation can be performed by passing the parameters to the target. The invocation context object can be provided to the target. Also, a transaction, security, or component-specific context can be passed to the target object. Any return value(s) from the target can be processed and returned to the container driver.

An API can be used for invocation handlers. Invocation handlers can be configured when the protocol adapter is deployed. For example, the HTTP protocol handler can be a web application.

Many types of built-in invocation handlers can be used. One such invocation handler is an EJB invocation handler. EJB invocation handlers can require a service identity, such as the JNDI name of the EJB home, and possibly a conversation ID, which can be extracted from a cookie, in the case of stateful EJB targets. The body of the request can indicate the operation name that will be mapped to the proper method call on the EJB.

A stateless EJB invocation handler can be used to dispatch web service invokes to an EJB. This handler can require the JNDI name of the stateless EJB home. The handler can obtain an instance of the EJB and can dispatch the invoke and return the return value, if there is one.

A stateful session EJB invocation handler can be used to dispatch invokes to a stateful session bean. The handler can require the JNDI name of the stateful EJB home, as well as a conversation ID, which can be extracted from the message. The default approach for HTTP can be to extract the conversation ID from a cookie in the HTTP protocol handler and to put it in the invocation context under a documented name. If this default behavior is not suitable, the developer can provide a header handler that extracts the conversation ID from message headers and places the ID in the invocation context.

A stateful session bean (SFSB) invocation handler can maintain a table of mappings between a conversation ID and EJB handles. If no conversation ID is found, the stateful EJB invocation handler can create a new conversation ID, a new session bean instance, and can add its handle to the mapping table. The invoke can then be dispatched to the SFSB referenced by the handle.

A JMS invocation handler can dispatch the body of a SOAP message to a JMS destination. The handler can require the JNDI name of the destination, the JNDI name of the connection factory, and the destination type.

The configuration of protocol handlers can involve specifying the mapping between web service endpoint URIs, such as URLs in the case of HTTP or email addresses in the case of SMTP, and the name of an invocation handler. A particular invocation handler can require additional configuration information, such as the JNDI-name of a target EJB deployment.

An HTTP protocol handler can be a special web application that is automatically deployed when a web archive file (WAR) is deployed. The URL mappings to invocation handlers can be extracted from the WSP ("web service provider") description of the web service. An HTTP protocol handler can map HTTP headers to the invocation context and can attempt to extract a conversation ID from an HTTP cookie, if one is present. An SMTP Protocol Handler can also be utilized.

An HTTP-based web service can be packaged in and deployed from a J2EE WAR that is contained inside a J2EE Enterprise Archive File (EAR). The WAR can contain a web service WSP document, which defines a web service. The WSP can describe the shape of the web service and how the implementation maps to backend components. A WSP can be referenced in the URL of a web service, like a JSP. It can also allow reference to user-defined tags, like a JSP which can integrate user-developed functions into the definition of the web service. It can also support the scripting of web service functions. Unlike a JSP, however, a WSP may not compile down to a servlet. The WSP can be directly utilized by the web service runtime.

The remaining contents of the EAR can include EJB-JARs or other classes that are part of the implementation of the web service.

A web container can manage the deployment of HTTP WSPs in a similar manner to JSPs. There can be a default WSP servlet registered with each web application that intercepts requests for WSPs. The default servlet can then redirect each request to the appropriate WSP handler.

A user can open a web application in a console, or in a console view, and can view the names of the WSPs that are part of that web application. It can be necessary to modify an MBean, such as WebAppComponentMBean, on order to provide a list of WSPs.

Java-based web services client distributions can be used with services hosted on many different platforms. A full set of features supported on a client can include:
 HTTP protocol with cookie support
 SOAP 1.2 with attachments
 JAX-RPC client API, including synchronous and "one-way" RPC invokes
 Header Handler and Flow Handler API
 Message-style web service client API
 Support for "dynamic mode" (no Java interfaces or WSDL required)
 Support for "static mode" (Java interfaces and service stubs required)
 The full set of SOAP encodings+Literal XML+support for custom encodings
 Security support; including
  128-bit two-way SSL;
  Digital Signatures; and,
  XML Data Encryption There is an inherent tradeoff between the "thinness" of a client and the richness of features that can be supported. To accommodate customers with differing needs regarding features and footprint, several different client runtime distributions can be offered with varying levels of features.

A J2SE Web Service client, which can have a footprint of around 1 MB, can be full-featured. SSL and JCE security functions can be included in separate jars. This client can run in regular VM environments, such as those hosting application servers. A J2ME/CDC thin client can have a limited set of features, but can be designed to run in a J2ME CDC profile on devices. A JDK 1.1 thin client can have a limited set of features, but can be intended to run in JDK 1.1 virtual machines, including those hosting applets.

Client distributions can include classes needed to invoke web services in "dynamic" mode. Utilities can be provided to generate static stubs and Java interfaces, if given WSDL service descriptions.

A Java™ 2 Platform, Standard Edition (J2SE) web service client can be a standard, full-featured client, which can be intended to run inside an application server. The client can be included in a regular server distribution, and can also be available in a separate jar so that it may be included in other J2EE or "fat client" JVMs. There may be no size restriction on this client. The client can utilize JDK 1.3.

Figure 3:
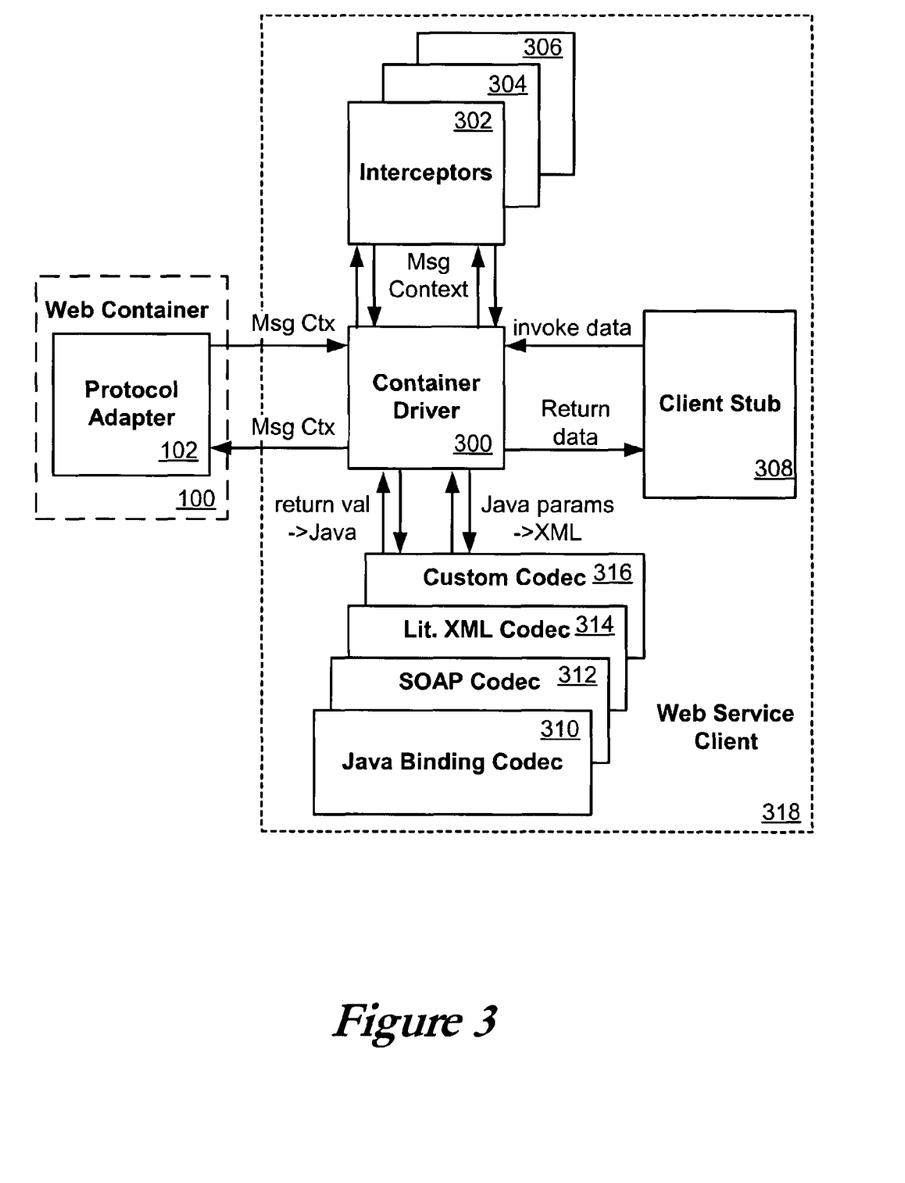
FIG. 3 is a diagram of a web service client that can be used with the system of FIG. 1.

FIG. 3 shows an architecture of the client-side for a J2SE web service client 318 in accordance with one embodiment of the present invention. The client is closely related to the web service container. The client can be an embeddable web service container that can run in lighter weight servers. This can allow asynchronous callbacks to be invoked on the client.

In FIG. 3, the HTTP protocol adapter 102 of the web container 100 is shown passing message context to, and receiving message context from, a container driver 300. The container driver 300 can receive message context from the protocol adapter 102 and send the message context to the registered inbound interceptors 302, 304, 306. After extracting performing any necessary data binding or unbinding, such as by using a Java Binding codec 310, a SOAP codec 312, an XML codec 314, or a custom codec 316, the container driver 300 can return the data to the client stub 308. If receiving invoke data from the client stub 308, the container driver 300 can perform any data binding or unbinding using the appropriate codecs 310, 312, 314, 316 and send the invoke request to the outbound interceptors 302, 304, 306. The container driver 300 can then send message context for the invoke to the protocol adapter 102.

Invoking Web Services Using JAX-RPC

The term "invoking a web service" refers to the actions that a client application performs to use the web service. Client applications that invoke web services can be written using any technology: for example, Java, Microsoft SOAP Toolkit, Microsoft.NET, and so on. As used herein, the term "client application" is used within the context of a WebLogic environment to refer to both a standalone client that uses the WebLogic thin client to invoke a web service, or a client that runs inside of an EJB running on WebLogic Server. This section describes how to use an implementation of the JAX-RPC specification in accordance with an embodiment of the invention to invoke a web service from a Java client application. Most of the following description assumes the developer is going to invoke any web service rather than one running on WebLogic Server, except for those sections that describe the URLs needed to invoke a WebLogic web service and its Home Page.

Programming and Invoking Web Services

In accordance with one embodiment the server (for example the WebLogic Server) provides optional Java client JAR files that include, all the classes, interfaces, and stubs needed to invoke a web service. The client JAR files include the client runtime implementation of the JAX-RPC specification (which in one embodiment are named "webserviceclient.jar" and "webserviceclient+ssl.jar"), as well as web service-specific implementations to minimize the amount of Java code needed to invoke a particular web service.

JAX-RPC API

The Java API for XML based RPC (JAX-RPC) is a standard specification that defines the client API for invoking a web service. The following list briefly describes the core JAX-RPC interfaces and classes.

Service—Main client interface. Used for both static and dynamic invocations.

ServiceFactory—Factory class for creating Service instances.

Stub—Represents the client proxy for invoking the operations of a web service. Typically used for static invocation of a web service.

Call—Used to dynamically invoke a web service.

JAXRPCException—Exception thrown if an error occurs while invoking a web service.

In accordance with an embodiment of the present invention, the server (eg. WebLogic Server) includes an implementation of the JAX-RPC specification.

Invoking Web Services: Main Steps

To create a Java client application that invokes a web service, the developer should follow these steps:

1. Download and install the webservices.jar file which contains the implementation of the JAX-RPC specification.

2. Obtain the Java client JAR files (provided by WebLogic Server) and add them to the developer's CLASSPATH. If the developer's client application is running on WebLogic Server, the developer can omit this step.

3. Write the Java client application code.

4. Compile and run the developer's Java client application.

Obtaining the Java Client JAR Files

An embodiment of WebLogic Server provides the following types of client JAR files:

A JAR file, named webserviceclient.jar, that contains the client runtime implementation of JAX-RPC. This JAR file is typically distributed as part of the WebLogic Server product.

A JAR file, named webserviceclient+ssl.jar, that contains an implementation of SSL. This JAR file is also typically distributed as part of the WebLogic Server product.

A JAR file that contains the web service-specific stubs, defined by the JAX-RPC specification, that client applications use to statically invoke a web service, such as Stub and Service. Almost all the code the developer needs is then automatically generated. If the developer is creating dynamic client applications, the developer does not need to use this JAR file. The file is provided as a convenience when the developer uses static clients to invoke web services.

To obtain the client JAR files, the developer should follow these steps:

1. Copy the file WL_HOME\server\lib\webserviceclient.jar to the developer's client application development computer, where WL_HOME refers to the top-level directory of WebLogic Platform. This client JAR file contains the client runtime implementation of JAX-RPC.

2. Generate the web service-specific client JAR file by running the clientgen Ant task. The developer should specify the wsdl attribute to create a client JAR file for any web service (including non-WebLogic ones) or the ear attribute for WebLogic web services packaged in EAR files.

Writing the Java Client Application Code

The following sections describe different types of Java client applications for invoking web services, from the simplest static client that requires almost no Java code, to a more complex client that uses out parameters. All of the examples discussed below use the JAX-RPC API, and assume that the developer has the required client JAR files in the developer's CLASSPATH.

Getting Information About a Web Service

The developer usually needs to know the name of the web service and the signature of its operations before writing the client code. There are a variety of ways of finding information about a web service to create a client application that invokes it. One way is to look at the WSDL of the web service. The name of the web service is contained in the <service> element, as shown in the following excerpt of the TraderService WSDL:

```
<service name="TraderService">
<port name="TraderServicePort"
binding="tns:TraderServiceSoapBinding">
...
</port>
</service>
```

The operations defined for this web service are listed under the corresponding <binding> element. For example, the following WSDL excerpt shows that the TraderService web service has two operations, "buy" and "sell" (for clarity, only relevant parts of the WSDL are shown):

```
<binding name="TraderServiceSoapBinding" ... >
...
<operation name="sell">
...
</operation>
<operation name="buy">
</operation>
</binding>
```

To find the full signature of the web service operations, the developer can un-JAR the web service-specific client JAR file (generated with the clientgen Ant task) and look at the actual *.java files. The file ServiceNamePort.java contains the interface definition of the developer's web service, where ServiceName refers to the name of the web service. For example, one can look at the TraderServicePort.java file for the signature of the buy and sell operations.

Simple Static Client

When the developer uses a static client application to invoke a web service, they use a strongly-typed Java interface, in contrast to a dynamic client where the developer indirectly references the web service operations and parameters. Using a dynamic client is analogous to looking up and invoking a method using the Java reflection APIs. The developer must include the web service-specific client JAR file in the CLASSPATH when statically invoking a web service. This JAR file includes the following classes and interfaces:

A web service-specific implementation of the Service interface, which acts a stub factory. The stub factory class uses the value of the wsdl attribute of the clientgen Ant task used to generate the client JAR file in its default constructor.

An interface and implementation of each SOAP port in the WSDL.

Serialization class for non-built-in data types and their Java representations.

The following code shows an example of invoking the sample TraderService web service. In this example, TraderService is the stub factory, and TraderServicePort is the stub itself:

```
package examples.webservices.ejb20.statelessSession;
// based on the ejb20 basic stateless example,
// converted to web services
public class Client {
public static void main(String[] args) throws Exception {
// Parse the argument list
Client client = new Client( ) ;
String wsdl = (args.length > 0? args[0] : null) ;
client.example(wsdl) ;
}
public void example(String wsdlURI) throws Exception {
TraderServicePort trader = null;
if (wsdlURI == null) {
trader = new TraderService( ).getTraderServicePort( ) ;
} else {
trader = new TraderService(wsdlURI).getTraderServicePort( ) ;
}
String [] stocks = {"BEAS", "MSFT", "AMZN", "HWP" } ;
// execute some buys
for (int i=0; i<stocks.length; i++) {
int shares = (i+1) * 100;
log("Buying "+shares+" shares of "+stocks[i] +".") ;
TradeResult result = trader.buy(stocks[i], shares) ;
log("Result traded "+result.getNumberTraded( )
+" shares of "+result.getStockSymbo( ) ) ;
}
// execute some sells
for (int i=0; i<stocks.length; i++) {
int shares = (i+1) * 100;
log("Selling "+shares+" shares of "+stocks[i] +".") ;
TradeResult result = trader.sell(stocks[i], shares) ;
log("Result traded "+result.getNumberTraded( )
+" shares of "+result.getStockSymbol( ) ) ;
}
}
private static void log(String s) {
System.out.println(s) ;
}
}
```

The main points to note about the example shown above are briefly described as follows. This code segment shows how to create a TraderServicePort stub:

```
trader = new TraderService( ).getTraderServicePort( ) ;
```

The TraderService stub implements the JAX-RPC Service interface. The default constructor of TraderService creates a stub based on the WSDL URI specified when using the clientgen Ant task to create the client JAR file. The getTraderServicePort( ) method implements the Service.getPort( ) method, used to return an instance of the TraderService stub implementation.

The following code shows how to invoke the buy operation of the TraderService web service:

```
TradeResult result = trader.buy(stocks[i], shares) ;
```

The trader web service shown in the above example has two operations: buy( ) and sell( ). Both operations return a non-built-in data type called TradeResult.

Dynamic Client That Uses WSDL

When the developer creates a dynamic client that uses WSDL, the developer first creates a service factory using the ServiceFactory.newInstance( ) method, then creates a Service object from the factory, passing it the WSDL and the name of the web service the developer is going to invoke. The developer then creates a Call object from the Service, passing it the name of the port and the operation the developer wants to execute, and finally uses the Call.invoke( ) method to actually invoke the web service operation.

When the developer writes a dynamic client, the developer does not use the web service-specific client JAR file generated with the clientgen Ant task, since this JAR file is used only for static clients. The developer does, however, need to include the JAR file that contains the implementation of the JAX-RPC specification in the developer's CLASSPATH.

For example, assume the developer wants to create a dynamic client application that uses WSDL to invoke the web service found at the following URL:

```
http://services.xmethods.net/soap/urn:xmethods-delayed-quotes.wsdl
```

The following Java code shows one way to do this:

```
package examples.jaxrpc.call2;
import java.net.URL;
import javax.xml.rpc.ServiceFactory;
import javax.xml.rpc.Service;
import javax.xml.rpc.Call;
import javax.xml.rpc.ParameterMode;
import javax.xml.rpc.namespace.QName;
public class GetStockQuote{
public static void main( String[] args ) throws Exception{
//set weblogic ServiceFactory
System.setProperty( "javax.xml.rpc.ServiceFactory",
"weblogic.webservice.core.rpc.ServiceFactoryImpl" ) ;
//create service factory
ServiceFactory factory = ServiceFactory.newInstance( ) ;
//define qnames
```

-continued

```
String targetNamespace = "http://www.themindelectric.com/" +
"wsdl/net.xmethods.services.stockquote.StockQuote/";
QName serviceName = new QName( targetNamespace,
"net.xmethods.services.stockquote.StockQuoteService" ) ;
QName portName = new QName( targetNamespace,
"net.xmethods.services.stockquote.StockQuotePort" ) ;
QName operationName = new QName( "urn:xmethods-delayed-quotes",
"getQuote" ) ;
URL wsdlLocation = new URL(
"http://services.xmethods.net/soap/urn:xmethods-delayed-quotes.wsdl"
) ;
//create service
Service service = factory.createService( wsdlLocation, serviceName ) ;
//create call
Call call = service.createCall( portName, operationName ) ;
//invoke the remote web service
Float result = (Float)call.invoke( new Object [] { "BEAS" } ) ;
System.out.println( result ) ;
}
}
```

Dynamic Client That Does Not Use WSDL

Dynamic clients that do not use WSDL are similar to those that use WSDL, except for having to explicitly set information that is found in the WSDL, such as the parameters to the operation, and the target endpoint address.

The following example shows how to invoke the same web service as in the previous example, but not specify the WSDL in the client application:

```
package examples.jaxrpc.call1;
import javax.xml.rpc.ServiceFactory;
import javax.xml.rpc.Service;
import javax.xml.rpc.Call;
import javax.xml.rpc.ParameterMode;
import javax.xml.rpc.namespace.QName;
public class GetStockQuote{
public static void main( String[] args ) throws Exception{
//set weblogic ServiceFactory
System.setProperty( "javax.xml.rpc.ServiceFactory",
"weblogic.webservice.core.rpc.ServiceFactoryImpl" ) ;
//create service factory
ServiceFactory factory = ServiceFactory.newInstance( ) ;
//define qnames
String targetNamespace = "http://www.themindelectric.com/" +
"wsdl/net.xmethods.services.stockquote.StockQuote/" ;
QName serviceName = new QName( targetNamespace,
"net.xmethods.services.stockquote.StockQuoteService" ) ;
QName portName = new QName( targetNamespace,
"net.xmethods.services.stockquote.StockQuotePort" ) ;
QName operationName = new QName( "urn:xmethods-delayed-quotes",
"getQuote" ) ;
//create service
Service service = factory.createService( serviceName ) ;
//create call
Call call = service.createCall( ) ;
//set port and operation name
call.setPortTypeName( portName ) ;
call.setOperationName( operationName ) ;
//add parameters
call.addParameter( "symbol", new Qname
( "http://www.w3.org/2001/XMLSchema",
"string" ), ParameterMode.IN ) ;
call.addParameter( "Result", new Qname
( "http://www.w3.org/2001/XMLSchema",
"float" ), ParameterMode.OUT ) ;
//set end point address
call.setTargetEndpointAddress( "http://64.39.29.211:9090/soap" ) ;
//invoke the remote web service
Float result = (Float)call.invoke( new Object [] { "BEAS" } ) ;
System.out.println( result ) ;
}
}
```

Client that Uses Out Parameters

Web services can use out or in-out parameters as a way of returning multiple values.

When the developer writes a client application that invokes a web service that uses out or in-out parameters, the data type of the out or in-out parameter must implement the javax.xml.rpc.holders.Holder interface. After the client application invokes the web service, the client can query the out or in-out parameters in the Holder object and treat them as if they were standard return values.

For example, the web service described by the following WSDL has an operation called echoStructAsSimpleTypes( ) that takes one standard input parameter and three out parameters:

http://soap.4s4c.com/ilab/soap.asp?WSDL

The following static client application shows one way to invoke this web service. The application assumes that the developer has included the web service-specific client JAR file that contains the Stub classes, generated using the clientgen Ant task, in the developer's CLASSPATH.

```
package examples.jaxrpc.xmethod1;
public class Main{
public static void main( String[] args ) throws Exception{
interopLab test = new interopLab( ) ;
interopTest2Port soap = test.getinteropTest2Port( ) ;
org.tempuri.x4s4c.x1.x3.wsdl.types.SOAPStruct inputStruct =
new org.tempuri.x4s4c.x1.x3.wsdl.types.SOApStructBase( ) ;
inputstruct.setVarInt( 10 ) ;
inputStruct.setVarFloat( 10.1f ) ;
inputStruct.setVarString( "hi there" ) ;
javax.xml.rpc.holders.StringHolder outputString =
new javax.xml.rpc.holders.StringHolder( ) ;
javax.xml.rpc.holders.IntHolder outputInteger =
new javax.xml.rpc.holders.IntHolder( ) ;
javax.xml.rpc.holders.FloatHolder outputFloat =
new javax.xml.rpc.holders.FloatHolder( ) ;
soap.echoStructAsSimpleTypes( inputStruct, outputString,
outputInteger, outputFloat ) ;
System.out.println( "outputString.value:" +outputString.value ) ;
System.out.println( "outputInteger.value:" +outputInteger.value ) ;
System.out.println( "outputFloat.value:" +outputFloat.value ) ;
}
}
```

Writing a J2ME Client

In some instances, the developer can create a Java 2 Platform, Micro Edition (J2ME) web service-specific client JAR file to use with client applications that run on J2ME. Additional information about J2ME can be found at www.java.sun.com/J2ME. The J2ME web service-specific client JAR file is not compliant with the JAX-RPC specification in that the methods of the generated stubs do not throw java.rmi.RemoteException; and the generated stubs do not extend java.rmi.Remote.

In addition, some implementations of the of WebLogic Server may not include an SSL-enabled client runtime JAR file for J2ME clients.

Creating a J2ME client application that invokes a web service is almost the same as creating a non-J2ME client. The developer should follow the steps described in "Invoking Web Services: Main Steps" above, but with the following changes:

When the developer runs the clientgen Ant task to generate the web service-specific client JAR file, they must specify the j2me="True" attribute, as shown in the following example:

```
<clientgen wsdl="http://example.com/myapp/myservice.wsdl"
    packageName="myapp.myservice.client"
    clientJar="c:/myapps/myService_clients.jar"
    j2me="True"
/>
```

When the developer writes, compiles, and runs the developer Java client application, they must use the J2ME virtual machine and APIs.

The WebLogic Web Services Home Page and WSDL URLs

Every web service deployed on WebLogic Server has a Home Page. From the Home page the developer can:

View the WSDL that describes the service;

Download the web service-specific client JAR file that contains the interfaces, classes, and stubs needed to invoke the web service from a client application; and, Test each operation to ensure that it is working correctly.

As part of testing a web service, the developer can edit the XML in the SOAP request that describes non-built-in data types to debug interoperability issues, or view the SOAP request and response messages from a successful execution of an operation.

The following URLs show first how to invoke the web service Home page and then the WSDL in the developer's browser:

```
[protocol] : // [host] : [port] / [contextURI] / [serviceURI]
[protocol] : // [host] : [port] / [contextURI] / [serviceURI]?WSDL
``` where in the above example the following terms take the meanings shown below:

"protocol" refers to the protocol over which the service is invoked, either http or https. This value corresponds to the protocol attribute of the <web-service> element that describes the web service in the web-servicex.xml file. If the developer used the servicegen Ant task to assemble the developer's web service, this value corresponds to the protocol attribute.

"host" refers to the computer on which the server (eg. WebLogic Server) is running.

"port" refers to the port number on which the server (eg. WebLogic Server) is listening (default value is 7001).

"contextURI" refers to the context root of the Web application, corresponding to the <context-root> element in the application.xml deployment descriptor of the EAR file. If the developer used the servicegen Ant task to assemble the developer's web service, this value corresponds to the contextURI attribute. If the developer's application.xml file does not include the <context-root> element, then the value of contextURI is the name of the Web application archive file or exploded directory.

"serviceURI" refers to the URI of the web service. This value corresponds to the uri attribute of the <web-service> element in the web-services.xml file. If the developer used the servicegen Ant task to assemble the developer's web service, this value corresponds to the serviceURI attribute.

For example, assume the developer used the following build.xml file to assemble a WebLogic web service using the servicegen Ant task:

```
<project name="buildWebservice" default="build-ear">
<target name="build-ear">
<servicegen
    destEar="myWebService.ear"
    warName="myWAR.war"
    contextURI="web_services">
<service
    ejbJar="myEJB.jar"
    targetNamespace="http://www.bea.com/examples/Trader"
    serviceName="TraderService"
    serviceURI="/TraderService"
    generateTypes="True"
    expandMethods="True" >
<client
    packageName="examples.webservices.Trader"
/>
</service>
</servicegen>
</target>
</project>
```

The URL to invoke the web service Home Page, assuming the service is running on a host named "ariel" at the default port number, is:

```
http://ariel:7001/web_services/TraderService
```

The URL to get the automatically generated WSDL of the web service is:

```
http://ariel:7001/web_services/TraderService?WSDL
```

Debugging Errors While Invoking Web Services

If the developer encounters an error while trying to invoke a web service (either WebLogic or non-WebLogic), it is useful to view the SOAP request and response messages that are generated because they often point to the problem.

To view the SOAP request and response messages, one can run the client application with a -Dweblogic.webservice.verbose=true flag, as shown in the following example that runs a client application called runService:

```
prompt> java -Dweblogic.webservice.verbose=true runService
```

The full SOAP request and response messages are then printed in the command window from which the developer runs the client application.

The developer can also configure the server to print the SOAP request and response messages each time a deployed WebLogic web service is invoked by specifying the -Dweblogic.webservice.verbose=true flag when WebLogic Server is started. The SOAP messages are printed to the command window from which the developer started WebLogic Server.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic oroptical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while embodiments of the invention have been described herein with respect to a WebLogic environment, that embodiments and implementations may also be used with other application servers, and other environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A storage medium including software system applications for providing access to web services, comprising:
    a protocol adapter that
        intercepts a web service invoke request wherein the invoke request is a web service message that has a message format and includes parameters,
        converts the message format of the invoke request,
        creates an initial message context including the invoke request, a placeholder for a response, and information about a transport, and
        routes the invoke request with the initial message context to an appropriate web services container based on a target of the invoke request;
    a container driver, at the web services container, that receives the invoke request and initial message context from the protocol adapter;
    a plurality of interceptors, utilized by the container driver to access inbound and outbound web service messages;
    wherein the container driver forwards the initial message context to one of the plurality of interceptors that
        receives the initial message context which includes a plurality of parts, wherein each part includes corresponding content,
        modifies the content of one or more of the parts of the initial message context to produce modified message context, and
        returns the modified message context to the container driver;
    an invocation handler that receives the modified message context from said container driver, passes the parameters from the modified message context to the target of the request, processes values returned from the target, and passes the values to the container driver, such that the container driver can formulate a response to the invoke request; and
    an invocation context that stores context data for processing the invoke request including a conversation ID, a message sequence number, and a security token, wherein the invocation context is an inheritable, thread local object which is accessible to the protocol adapter, interceptors and invocation handler, and wherein the invocation handler controls read/write access to the invocation context.

2. The storage medium of claim 1 wherein the client utilizes JAX-RPC to invoke the web services.

3. The storage medium of claim 1 wherein said container driver is adapted to perform any data binding and unbinding required to process the invoke request.

4. The storage medium of claim 1, further comprising a plugin component to be used by said container driver to perform any data binding and unbinding.

5. The storage medium of claim 1, wherein said invocation handler manages security policies, transaction management, and target object life cycle for the request.

6. The storage medium of claim 1, further comprising a web service container for hosting said container driver, said interceptor, and said invocation handler.

7. The storage medium of claim 1, further comprising a target object to which said invocation handler can delegate processing the invoke request.

8. A method for use in providing access to web services, comprising:
    intercepting at a web server computer a web service invoke request using a protocol adapter, wherein the invoke request is a web service message having a message format and where the invoke request includes parameters;
    converting the message format of the invoke request by the protocol adapter;
    creating an initial message context including the invoke request, a placeholder for a response, and information about a transport;
    routes the invoke request with the initial message context to an appropriate web services container based on a target of the invoke request;
    receiving, at a container driver, the invoke request and the initial message context from the protocol adapter;
    forwarding the initial message context for the invoke request for a web service to one of a plurality of interceptors, wherein the plurality of interceptors are utilized by the container driver to access inbound and outbound web service message, and wherein the initial message context includes a plurality of parts, wherein each part includes corresponding content;
    modifying the content of one or more of the parts of the initial message context to produce modified message context;
    returning the modified message content to the container driver;
    receiving the modified message context from the container driver at an invocation handler, wherein the invocation handler
        passes the parameters from the modified message context to the target of the request,
        processes values returned from the target, and
        passes the values to the container driver such that the container driver can formulate a response to the invoke request;
    storing, in an invocation context, context data for processing the invoke request including a conversation ID, a message sequence number, and a security token, wherein the invocation context is an inheritable, thread local object which is accessible to the protocol adapter, interceptors and invocation handler, and wherein an invocation handler controls read/write access to the invocation context.

9. The method of claim 8 wherein a client utilizes JAX-RPC to invoke the web service.

10. The method of claim 8 wherein a container driver is used to perform any data binding and unbinding required to process the invoke request.

11. The method of claim 8, wherein the receiving and modifying steps are performed using an interceptor.

12. The method of claim 8, further comprising providing the modified message context to the invocation handler that passes parameters from the modified message context to a target of the request, processes values returned from the target, and passes the values to a container driver, such that the container driver can formulate a response to the invoke request.

13. The method of claim 8, further comprising managing life cycle, transaction, and security information for the processing of the invoke request.

14. The method of claim 8, further comprising delegating the processing of the invoke request to a target object.

15. A computer readable medium, including instructions stored thereon which when executed by the computer cause the computer to perform the steps of:
    intercepting a web service invoke request using a protocol adapter, wherein the invoke request is a web service message having a message format and wherein the invoke request includes parameters;
    converting the message format of the invoke request by the protocol adapter;
    creating an initial message context including the invoke request, a placeholder for a response, and information about a transport;
    routes the invoke request with the initial message context to an appropriate web services container based on a target of the invoke request;
    receiving, at a container driver, the invoke request and the initial message context from the protocol adapter;
    forwarding the initial message context for the invoke request for the web service from the container driver to one of a plurality of interceptors, wherein the plurality of interceptors are utilized by the container driver to access inbound and outbound web service message, and wherein the initial message context includes a plurality of parts, wherein each part includes corresponding content;
    modifying, at the interceptor, the content of one or more of the parts of the initial message context to produce modified message context for the web service;
    returning the modified message content to the container driver;
    receiving, at an invocation handler, the modified message context from the container driver, wherein the invocation handler
        passes the parameters from the modified message context to the target of the request,
        processes values returned from the target, and
        passes the values to the container driver such that the container driver can formulate a response to the invoke request;
    storing, at an invocation context, context data for processing the invoke request including a conversation ID, a message sequence number, and a security token, wherein the invocation context is an inheritable, thread local object which is accessible to the protocol adapter, interceptors and invocation handle, and wherein the invocation handler controls read/write access to the invocation context;
    passing, from the invocation handler to a target of the request, parameters from the modified message context;
    processing, at the invocation handler, values returned from the target;
    passing the values from the invocation handler to the container driver; and
    formulating, at the container driver, a response to the invoke request.

16. The storage medium of claim 1, wherein the plurality of parts for the initial message context and the plurality of parts for the modified message context each include a request message and a response message with a difference between the initial message context and the modified message context being the content of one or more of these parts.

17. The storage medium of claim 1, wherein the interceptor reads and writes information on the invocation context.

18. The storage medium of claim 1, wherein the initial message context and the modified message context each include transport information, wherein the transport information comprises information specific to the transport over which the request came, and over which the response is sent.

19. The storage medium of claim 1 wherein the protocol adapter receives data in response to the invoke request and returns the data to the client.

20. The storage medium of claim 19 wherein the protocol adapter converts a message format of the data in response to the invoke request to match the message format of the invoke request.

21. The method of claim 8 wherein the protocol adapter receives data in response to the invoke request and returns the data to the client.

22. The method of claim 21 wherein the protocol adapter converts a message format of the data in response to the invoke request to match the message format of the invoke request.

23. A storage medium including software system applications for providing access to web services, comprising:
    a protocol adapter that
        intercepts a web service invoke request wherein the invoke request is a web service message that has a message format and includes parameters,
        converts the message format of the invoke request,
        creates an initial message context including the invoke request, a placeholder for a response, and information about a transport, and
        routes the invoke request with the initial message context to an appropriate web services container based on a target of the invoke request;
    a container driver, at the web services container, that receives the invoke request and initial message context from the protocol adapter;
    a plurality of interceptors, utilized by the container driver to access inbound and outbound web service messages;
    wherein the container driver forwards the initial message context to one of the plurality of interceptors that
        receives the initial message context which includes a plurality of parts, wherein each part includes corresponding content,
        modifies the content of one or more of the parts of the initial message context to produce modified message context, and
        returns the modified message context to the container driver;

a plurality of codecs utilized by the container driver to perform data binding;

an invocation handler that receives the modified message context from said container driver, passes the parameters from the modified message context to the target of the request, processes values returned from the target, and passes the values to the container driver, such that the container driver can formulate a response to the invoke request; and an invocation context that stores context data for processing the invoke request including a conversation ID, a message sequence number, and a security token, wherein the invocation context is an inheritable, thread local object which is accessible to the protocol adapter, interceptors and invocation handler, and wherein the invocation handler controls read/write access to the invocation context.

* * * * *